United States Patent [19]

Occelli

[11] Patent Number: 5,133,951
[45] Date of Patent: Jul. 28, 1992

[54] PROCESS FOR MAKING A CRYSTALLINE GALLIOSILICATE WITH THE OFFRETITE STRUCTURE

[75] Inventor: Mario L. Occelli, Yorba Linda, Calif.

[73] Assignee: Union Oil Company of California, Los Angeles, Calif.

[21] Appl. No.: 540,897

[22] Filed: Jun. 20, 1990

Related U.S. Application Data

[63] Continuation-in-part of Ser. No. 904,027, Sep. 4, 1986, abandoned, and a continuation-in-part of Ser. No. 414,471, Sep. 29, 1989, Pat. No. 4,994,250.

[51] Int. Cl.$^5$ ............................................. C01B 33/20
[52] U.S. Cl. .................................. 423/326; 423/328; 502/61; 502/77
[58] Field of Search .................. 423/326, 328, 329; 502/61, 77

[56] References Cited

U.S. PATENT DOCUMENTS

| | | | |
|---|---|---|---|
| 3,431,219 | 3/1969 | Argauer | 502/61 |
| 3,578,398 | 5/1971 | Jenkins | 423/328 |
| 3,709,979 | 1/1973 | Chu | 423/329 |
| 4,331,641 | 5/1982 | Hinnenkamp et al. | 423/277 |
| 4,340,573 | 7/1982 | Vaughan et al. | 423/328 |
| 4,495,303 | 1/1985 | Kuehl | 423/328 |
| 4,521,297 | 6/1985 | Angevine et al. | 208/89 |
| 4,554,146 | 11/1985 | Vaughan | 423/329 |
| 4,576,805 | 3/1986 | Chang et al. | 423/277 |
| 4,585,641 | 4/1986 | Barri et al. | 423/331 |
| 4,803,060 | 2/1989 | Occelli | 423/326 |
| 4,931,266 | 6/1990 | Occelli | 423/326 |

FOREIGN PATENT DOCUMENTS

| | | |
|---|---|---|
| 1182096 | 2/1985 | Canada ............... 423/328 |
| 0074651 | 3/1983 | European Pat. Off. |
| 0130013 | 1/1985 | European Pat. Off. |
| 1188043 | 4/1970 | United Kingdom |

OTHER PUBLICATIONS

M. L. Occelli, R. A. Innes, T. M. Apple and B. C. Gerstein, "Surface Properties of Offretite and ZSM-34 Zeolites", Sixth International Zeolite Conference, Reno, Nevada, 1983, pp. 674-683.

S. Hayashi, K. Suzuki, S. Shin, K. Hayamizu and O. Yamamoto, "High Resolution $^{29}$Si Nuclear Magnetic Resonance Study on Gallosilicates with Zeolitic Structures", Bull. Chem. Soc. Jpn., vol. 58, 1985, pp. 52-57.

J. M. Newsam, D. E. W. Vaughan, "Structural Studies of Gallosilicate Zeolites", New Developments in Zeolite Science and Technology, Proceedings of the 7th International Zeolite Conference, Tokyo, 1986, pp. 457-464.

J. V. Sanders, M. L. Occelli, R. A. Innes and S. S. Pollack, "Quaternary Ammonium Cation Effects on the Crystallization of Zeolites of the Offretite-Erionite Family Part II. Electron Diffraction Studies", New Developments in Zeolite Science and Technology, Proceedings of the 7th International Zeolite Conference, Tokyo, Japan, 1986, pp. 429-436.

D. W. Breck, Zeolite Molecular Sieves, Robert E. Krieger Publishing Co., Malabar, Fla., 1984, pp. 311-312 and 320-322.

R. M. Barrer, Hydrothermal Chemistry of Zeolites, Academic Press, 1982, pp. 166-167 and 282-283.

Primary Examiner—R. Bruce Breneman
Attorney, Agent, or Firm—Yale S. Finkle; Gregory F. Wirzbicki

[57] ABSTRACT

A crystalline, galliosilicate molecular sieve having the offretite structure comprises silicon, gallium, oxygen and substantially no aluminum. The molecular sieve is synthesized by crystallizing a hydrogel reaction mixture which is preferably formed by mixing a substantially alumina-free galliosilicate hydrogel containing an offretite selective templating or directing agent with a galliosilicate solution substantially free of alumina. The crystallized molecular sieve can be employed, after activation by removing the templating agent and reducing its alkali metal content, as a component of a catalyst which is suitable for use in a variety of chemical conversion processes, preferably hydrocarbon conversion processes.

33 Claims, 2 Drawing Sheets

PROCESS FOR MAKING A CRYSTALLINE GALLIOSILICATE WITH THE OFFRETITE STRUCTURE

CROSS-REFERENCE TO RELATED APPLICATIONS

This application is a continuation-in-part of application Ser. No. 904,027 filed in the U.S. Patent and Trademark Office on Sep. 4, 1986 and a continuation-in-part of application Ser. No. 414,471 filed in the U.S. Patent and Trademark Office on Sep. 29, 1989. The disclosures of both applications are hereby incorporated by reference in their entireties.

BACKGROUND OF THE INVENTION

This invention relates to methods of producing crystalline galliosilicates and is particularly concerned with making a crystalline galliosilicate molecular sieve having the offretite structure.

Zeolites are well-known natural and synthetic molecular sieves that can be defined as crystalline, three-dimensional aluminosilicates consisting essentially of alumina and silica tetrahedra which interlock to form discrete polyhedra. The polyhedra are interconnected to form a framework which encloses cavities or voids that are interconnected by channels or pores. The size of the cavities and pores will vary depending on the framework structure of the particular zeolite. Normally, the cavities are large enough to accommodate water molecules and large cations which have considerable freedom of movement, thereby permitting sorption, reversible dehydration and ion exchange. The dimensions of the cavities and pores in a zeolite are limited to a small number of values and can vary from structure to structure. Thus, a particular zeolite is capable of sorbing molecules of certain dimension while rejecting those of dimensions larger than the pore size associated with the zeolite structure. Because of this property zeolites are commonly used as molecular sieves.

In addition to their molecular sieving properties, zeolites show a pronounced selectivity toward polar molecules and molecules with high quadrupole moments. This is due to the ionic nature of the crystals which gives rise to a high nonuniform electric field within the micropores of the zeolite. Molecules which can interact energetically with this field, such as polar or quadrupolar molecules, are therefore sorbed more strongly than nonpolar molecules. This selectivity toward polar molecules is the unique property of zeolites which allows them to be used as drying agents, and selective sorbents.

The pore size of a zeolite can vary from about 2.6 angstroms for analcime to about 10.0 angstroms for zeolite omega. The term "pore size" as used herein refers to the diameter of the largest molecule that can be sorbed by the particular zeolite or other molecular sieve in question. The measurement of such diameters and pore sizes is discussed more fully in chapter 8 of the book entitled "Zeolite Molecular Sieves," written by D. W. Breck and published by John Wiley & Sons in 1974, the disclosure of which book is hereby incorporated by reference in its entirety. The pore size range of 2.6 to 10.0 angstroms is particularly suited for molecular separation and catalytic processing. Analcime will sorb ammonia while excluding larger molecules whereas zeolite omega will sorb perfluorotributyl amine $[(C_4F_9)_3N]$ while excluding any molecule having a diameter greater than about 10.0 angstroms. All of the other approximately 150 zeolites now known have pore sizes falling within the range between 2.6 and 10.0 angstroms.

In addition to their use as drying agents and selective sorbents, zeolites are widely used as components of chemical conversion catalysts. As found in nature or as synthesized, zeolites are typically inactive because they lack acid sites. In general, acid sites are created by subjecting the zeolite to an ion exchange with ammonium ions followed by some type of thermal treatment which creates acid sites by decomposing the ammonium ions into gaseous ammonia and protons. Activated zeolites have been used in many types of chemical conversion processes with the smaller pore zeolites being used to selectively sorb and crack normal and moderately branched chain paraffins.

Because of the unique properties of zeolitic molecular sieves, there have been many attempts at synthesizing new molecular sieves by either substituting an element for the aluminum or silicon present in zeolitic molecular sieves or adding another element in addition to the aluminum and silicon. The term "zeolitic" as used herein refers to molecular sieves whose frameworks are formed of substantially only silicon and aluminum atoms in tetrahedral coordination with oxygen atoms. One such class of new molecular sieves that has been created is that in which all the framework aluminum has been replaced by gallium. Specifically, it has been reported in the literature that galliosilicate molecular sieves having the faujasite structure, the pentasil structure, and the mordenite structure have been synthesized. The synthesis of a galliosilicate analogue of Theta-1 zeolite has also been reported In addition, Canadian Patent 1,182,096 discloses molecular sieves having a structure similar to that of offretite but which contain both aluminum and gallium along with silicon. The process for synthesizing the disclosed gallioaluminosilicate molecular sieves, as illustrated in Examples 1 through 3 of the Canadian patent, involves mixing a colloidal silica gel with gallium (III) oxide, sodium hydroxide, potassium hydroxide, sodium aluminate or aluminum hydroxide, water and tetramethylammonium chloride to form a mixture which is stirred and then heated in a closed vessel at 95° C. or above. According to the examples, crystallization times ranged between 72 and 120 hours. Although such times are not excessive, shorter crystallization times will result in substantial savings in the energy required for crystallization. There does not appear to be any reported instance in the literature of an alumina-free galliosilicate with the offretite structure having been synthesized from a reaction mixture free of added aluminum in relatively short periods of time, e.g., less than about 24 hours.

Accordingly, it is one of the objects of the present invention to provide an essentially alumina-free, crystalline, galliosilicate molecular sieve with the offretite structure, and methods for preparing such a molecular sieve, which can be useful in many types of chemical conversion processes, particularly hydrocarbon conversion processes. This and other objects of the invention will become more apparent in view of the following description of the invention.

SUMMARY OF THE INVENTION

In accordance with the invention it has now been found that a crystalline, galliosilicate molecular sieve comprising silicon, gallium, oxygen and essentially no aluminum, and having the offretite crystal structure can be synthesized by crystallizing an essentially alumina-free hydrogel reaction mixture in which the components have the following mole ratios:

$SiO_2/Ga_2O_3 = 6$ to 30

$(M_2O + N_2O)/Ga_2O_3 = 1$ to 15

$H_2O/Ga_2O_3 = 80$ to 1000

$Q_2O/Ga_2O_3 = 0.1$ to 10 where M is an alkali metal, N is an alkali metal other than M and Q is a cation derived from an offretite selective templating agent. The crystallized molecular sieve typically has the composition, expressed in terms of oxide mole ratios in the anhydrous state, of $Ga_2O_3:xSiO_2:yM_2O:zN_2O:tQ_2O$ where x equals 5.5 to 30, y equals 0.1 to 0.9, z equals 0.1 to 0.9, t equals 0.1 to 0.6, and $z+y+t$ equals about 1.0. The X-ray powder diffraction pattern of the molecular sieve contains at least the d-spacings set forth in Table 1 below, which d-spacings are typically characteristic of a zeolite with the offretite structure.

TABLE 1

| Interplanar d-spacings (Angstroms) | Relative Intensity (100 × $I/I_o$) |
|---|---|
| 11.52 ± 0.50 | 80–100 |
| 6.64 ± 0.20 | 30–60 |
| 4.34 ± 0.15 | 30–60 |
| 3.77 ± 0.15 | 50–100 |
| 3.61 ± 0.10 | 50–75 |
| 2.86 ± 0.10 | 70–90 |

In a preferred galliosilicate molecular sieve, M is sodium, N is potassium, and Q is a quaternary ammonium cation. Although the hydrogel reaction mixture that is crystallized to form the galliosilicate molecular sieve of the invention can be formed by mixing, in the absence of a source of alumina, a source of gallia, a source of silica, a source of one alkali metal, a source of a different alkali metal, a templating agent and water, it may be desirable, especially if very short crystallization times are desired, to form the hydrogel by adding a galliosilicate solution substantially free of alumina and having the following composition expressed in oxide mole ratios $SiO_2/Ga_2O_3 = 5$ to 30

$(M_2O + N_2O)/Ga_2O_3 = 6$ to 20

$H_2O/Ga_2O_3 = 200$ to 800 to a galliosilicate hydrogel substantially free of alumina and having the following composition expressed in oxide mole ratios $SiO_2/Ga_2O_3 = 8$ to 15

$(M_2O + N_2O)/Ga_2O_3 = 1$ to 10

$H_2O/Ga_2O_3 = 80$ to 1000

$Q_2O/Ga_2O_3 = 0.1$ to 10.

It has been surprisingly found that, when the hydrogel reaction mixture is formed by the above-described "two-batch" method, the time to obtain complete crystallization of the reaction mixture into the galliosilicate molecular sieve of the invention is substantially reduced, typically to less than 24 hours and, in some cases, to less than 10 hours.

DETAILED DESCRIPTION OF THE INVENTION

Figure 1:
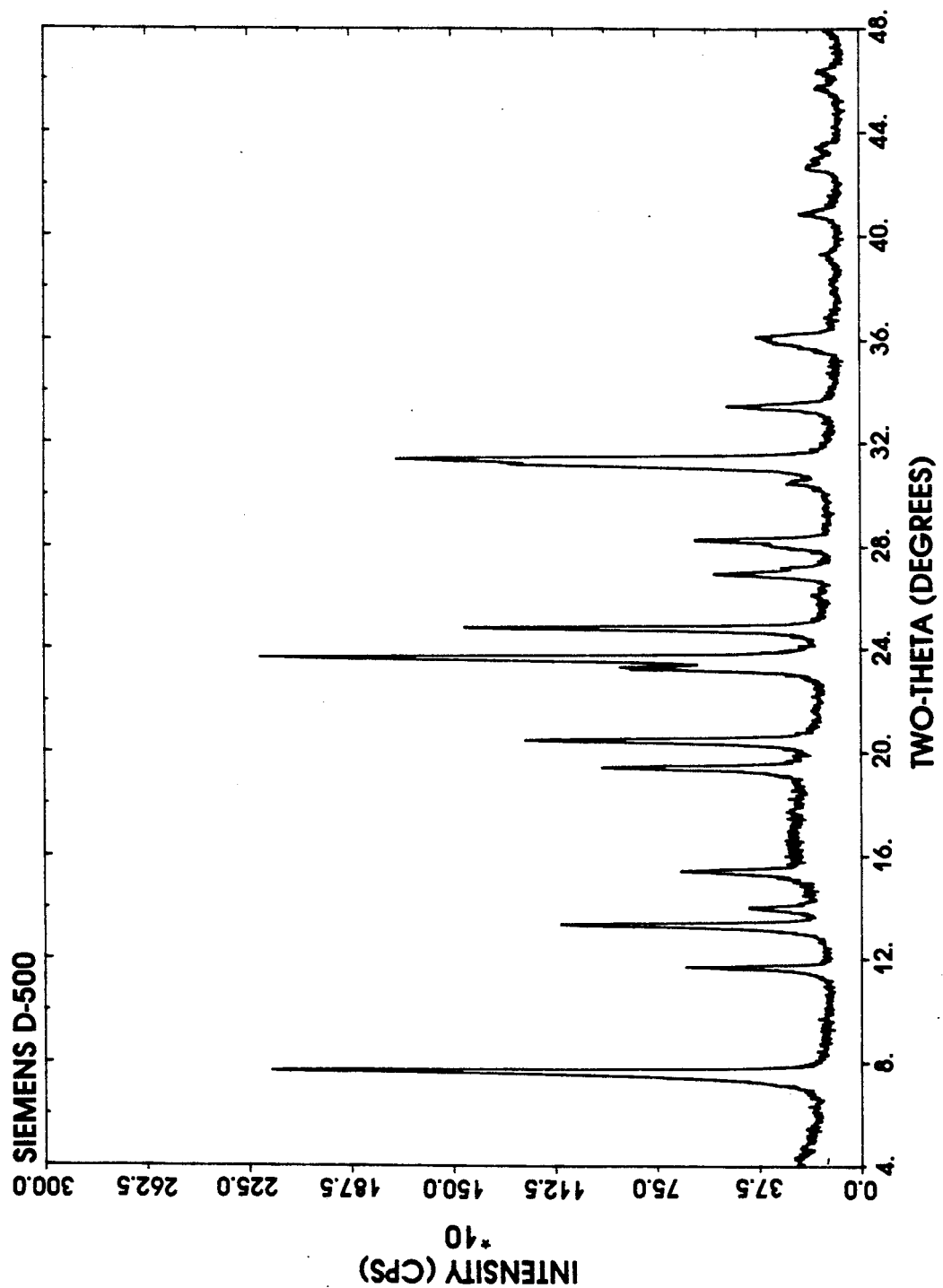
FIG. 1 in the drawing shows the X-ray powder diffraction pattern of a zeolite with the offretite structure.

In one embodiment of the process of the invention, hereinafter referred to as the "one-batch" method, the crystalline, galliosilicate molecular sieve of the invention is prepared by crystallizing a hydrogel reaction mixture formed by mixing a source of gallia, a source of silica, a source of two different alkali metals and an offretite selective templating agent with water under conditions such that the various components react to form the desired hydrogel. In another embodiment of the process of the invention, hereinafter referred to as the "two-batch" method, the galliosilicate molecular sieve of the invention is prepared by crystallizing a hydrogel reaction mixture formed by mixing a substantially alumina-free galliosilicate hydrogel with a galliosilicate solution essentially free of alumina and particulates. The galliosilicate hydrogel is formed separately from the galliosilicate solution by mixing, in the absence of a source of aluminum or alumina, a source of gallia, a source of silica, a source of two different alkali metals and an offretite selective templating agent with water under conditions such that the various components react to form the desired hydrogel. The galliosilicate solution is formed by mixing a source of gallia, a source of silica, a source of one of the alkali metals used to form the galliosilicate hydrogel, and water in the absence of both an organic templating or directing agent and a source of aluminum or alumina. Since a source of aluminum or alumina is not used in forming the hydrogel reaction mixture in the one-batch method or in forming either the galliosilicate hydrogel or galliosilicate solution which are mixed to form the hydrogel reaction mixture of the two-batch method, the only alumina or aluminum that could possibly be present in the hydrogel reaction mixtures or the galliosilicate molecular sieves of the invention crystallized therefrom will be alumina or aluminum impurities that may be present in the source materials. Thus, the hydrogel reaction mixtures and the galliosilicate molecular sieves crystallized therefrom will normally contain less than about 0.1 weight percent alumina and less than about 0.1 weight percent aluminum, preferably less than about 0.05 weight percent of each, and will usually be substantially free of both alumina and aluminum.

The silica used in forming the hydrogel reaction mixture of the one-batch embodiment of the process of the invention and the galliosilicate hydrogel and galliosilicate solution that are combined to form the hydrogel reaction mixture of the two-batch embodiment of the process of the invention may be in the form of sodium silicate, silica hydrosols, silica gels, silica salts, silicic acid sols, silicic acid gels, aerosols, organic silica salts such as tetramethylammonium silicate and methyltriethoxysilane, and reactive amorphous solid silicas. The source of the silica can be in either the liquid or solid state. Examples of reactive, amorphous solid silicas that may be used include fumed silicas, chemically precipitated silicas, and precipitated silica sols usually having a particle size of less than 1 micron in diameter. The preferable sources of silica are sodium silicates (water glass) and aqueous colloidal dispersions of silica particles.

The source of alkali metals used in forming the hydrogel reaction mixture of the one-batch method and the galliosilicate hydrogel and solution used to form the hydrogel reaction mixture of the two-batch method may be any alkali metal salt or hydroxide. Although any combination of two different alkali metal sources may be utilized, it is preferable that a source of sodium and a source of potassium be employed. A source of one of the alkali metals used to form the galliosilicate hydrogel of the two-batch embodiment of the process of the invention is normally also used to prepare the galliosilicate solution employed in that embodiment with a source of sodium being preferred. It is possible for the source of the alkali metal used in both the one-batch and two-batch embodiments of the invention to also be the source of gallia. Alkali metal gallates are examples of materials which serve as a source of both an alkali metal and gallia.

The gallia used to produce the hydrogel reaction mixture of the one-batch method and the galliosilicate hydrogel and solution used to form the hydrogel reaction mixture of the two-batch method may be in the form of gallium oxide, gallium hydroxide, an alkali metal gallate or an inorganic gallium salt, such as gallium nitrate, gallium sulfate, or gallium acetate. As mentioned above, the source of the gallia may also be the source of the alkali metals. In fact, a preferred source of gallia is prepared by dissolving gallium oxide in an aqueous solution of sodium and potassium hydroxide to form potassium gallate and sodium gallate which are then used as components to form the hydrogel reaction mixture of the one-batch method and the galliosilicate hydrogel of the two-batch method.

The templating agent used to form the hydrogel reaction mixture of the one-batch method and the galliosilicate hydrogel of the two-batch method is normally any organic compound which, when in solution, yields cations, such as quaternary ammonium cations and protonated amines, that direct crystallization toward the offretite structure, i.e., are offretite selective. Typically, the templating agent is either an amine or a quaternary ammonium compound. Examples of amines that possibly may be used as the templating agent include ethylene diamine, diethyl triamine, triethylene tetraamine, and alkanolamines while examples of quaternary ammonium compounds that possibly could be used include tetramethyl, tetrapropyl, tetraethyl and tetrabutylammonium halides and hydroxides, choline chloride and hydroxide, benzyltriethyl and benzyltrimethyl ammonium halides and hydroxides, and derivatives of 1,4-diazabicyclo (2,2,2) octane. The preferred templating agents are tetramethylammonium halides and hydroxide, choline chloride, benzyltrimethylammonium and benzyltriethylammonium chloride and hydroxide and derivatives of 1,4-diazabicyclo (2,2,2) octane. The most preferred templating agents for use in making the crystalline galliosilicate of the invention are tetramethylammonium chloride and hydroxide.

The hydrogel reaction mixture from which the galliosilicate molecular sieve of the invention is crystallized in the one-batch embodiment of the process of the invention is normally prepared by first dissolving a source of gallia in a clear aqueous solution containing a mixture of two alkali metal hydroxides, preferably potassium and sodium hydroxide. The resulting solution is then mixed with a templating agent and a source of silica to form a hydrogel which is vigorously stirred. A sufficient amount of the gallia source, the silica source, the sources of alkali metals, the templating agent and water is used so that the resultant hydrogel contains the following oxide mole ratios of components:

| | |
|---|---|
| $SiO_2/Ga_2O_3 = 6$ to 30, preferably 10 to 15 | (1) |
| $(M_2O + N_2O)/Ga_2O_3 = 1$ to 15, preferably 2 to 5 | (2) |
| $H_2O/Ga_2O_3 = 80$ to 1000, preferably 100 to 400 | (3) |
| $Q_2O/Ga_2O_3 = 0.1$ to 10, preferably 0.5 to 5.0 | (4) | where M is an alkali metal, preferably sodium, N is another alkali metal, preferably potassium, and Q is a cation derived from the templating agent, preferably a quaternary ammonium cation.

After all of the components of the hydrogel have been combined together, the hydrogel is vigorously stirred at atmospheric pressure and at a temperature between about 20° C. and about 60° C., preferably at about ambient temperature, for from about 1 hour to about 2 days, preferably between about 1 and 10 hours. After stirring, the hydrogel is crystallized by heating, with or without stirring or agitation, for between about 1 day and 10 days at temperatures in the range between about 70° C. and 250° C., preferably between about 90° C. and 175° C. The temperature is normally controlled within the above ranges to avoid the formation of phase impurities. After the hydrogel has been crystallized, the resulting slurry is passed to a filter, centrifuge or other separation device to remove the excess reactants or mother liquor from the crystallized molecular sieve. The crystals are then washed with water and dried at a temperature between about 50° C. and about 200° C. to remove surface water.

When using the above-described one-batch method of synthesizing the galliosilicate molecular sieve of the invention, it is typically difficult to obtain complete crystallization of the hydrogel reaction mixture in less than about 24 hours. It has been surprisingly found that the time to achieve essentially complete crystallization can be substantially reduced if the hydrogel reaction mixture subjected to crystallization is formed via the two-batch method, i.e., by adding a galliosilicate solution free of alumina and dispersed particles to a galliosilicate hydrogel free of alumina.

The galliosilicate hydrogel used to form the hydrogel reaction mixture in the two-batch embodiment of the process of the invention is normally prepared by first dissolving a source of gallia in a solution containing a mixture of two alkali metal hydroxides, preferably potassium and sodium hydroxide. The resulting solution is then mixed with an offretite selective templating agent and a source of silica to form a hydrogel which is then vigorously stirred. A sufficient amount of the gallia source, the silica source, the sources of alkali metals, the templating agent and water is used so that the resultant hydrogel contains the following oxide mole ratios of components:

$SiO_2/Ga_2O_3 = 8$ to 15, preferably 9 to 12

$(M_2O + N_2O)/Ga_2O_3 = 1$ to 10, preferably 2 to 5

$H_2O/G_1O_3 = 80$ to 1000, preferably 100 to 400

$Q_2O/Ga_2O_3 = 0.1$ to 10; preferably 0.5 to 5.0 where, as before, M is an alkali metal, preferably sodium, N is another alkali metal, preferably potassium, and Q is a cation derived from the templating agent, preferably a quaternary ammonium cation.

The galliosilicate solution that is added to the hydrogel to form the crystallization or reaction mixture is substantially free of alumina and dispersed particles and is typically prepared by dissolving a source of gallia in a solution of one of the alkali metals used to form the hydrogel and mixing the resulting solution with a silica source. A sufficient amount of the gallia source, the silica source, the alkali metal source and water is used so that the resultant mixture contains the following oxide mole ratios of components:

$SiO_2/Ga_2O_3 = 5$ to 30, preferably 10 to 20

$(M_2O$ or $N_2O)/Ga_2O_3 = 6$ to 20, preferably 8 to 15

$H_2O/Ga_2O_3 = 200$ to 800, preferably 300 to 500

Generally, a sufficient amount of the alkali metal source is used so that the alkali metal/gallia mole ratio is such that a gel is not formed when the components are mixed together or, if a gel is formed upon the mixing of the components, it can be forced into solution by stirring at ambient temperature.

After the galliosilicate hydrogel and the galliosilicate solution have been separately prepared, a sufficient amount of the solution is added to the hydrogel so that the resultant mixture, which remains in a gel form, contains between about 1 and about 40 weight percent of the solution, preferably between about 10 and 30 weight percent, and will have a composition expressed in oxide mole ratios in the same ranges as those in the crystallization or reaction mixture prepared by the one-batch method, i.e., the composition represented by equations (1) to (4) above.

The reaction mixture is then stirred at atmospheric pressure and at a temperature between about 20° C. and about 60° C., preferably at about ambient temperature, for from about 1 hour to about 2 days, preferably between mixture is crystallized by heating, with or without stirring or agitation, for between about 8 hours and 48 hours at a temperature in the range between about 70° C. and 250° C., preferably between about 90° C. and 175° C., and most preferably between about 90° C. and 120° C. The temperature is normally controlled within the above ranges to avoid the formation of phase impurities. Usually, about 24 hours, typically in less than about 15 hours, and quite frequently in 10 hours or less. Such short crystallization times in comparison to the one-batch embodiment of the process of the invention have potentially large economic advantages due to energy savings obtained when crystallization is more rapidly completed.

The crystallized molecular sieve of the invention, whether produced by the one-batch method or the two-batch method, will normally have the following composition expressed in terms of oxide mole ratios in the anhydrous state:

$$Ga_2O_3{:}xSiO_2{:}yM_2O{:}zN_2O{:}tQ_2O \qquad (5)$$

where M is an alkali metal, preferably sodium, N is an alkali metal other than M, preferably potassium, Q is a cation derived from the offretite selective templating agent, x equals 5.5 to 30, preferably about 6 to 15, y equals 0.1 to 0.9, equals 0.1 to 0.9, t equals 0.1 to 0.6, and the sum of y, z, and t equals approximately 1.0. The X-ray powder diffraction pattern of the crystallized molecule sieve of the invention will typically contain at least the d-spacings set forth in Table 1, preferably the d-spacings set forth in Table 2 below.

TABLE 2

| Bragg Angle 2-Theta (Degrees) | Interplanar d-spacings (Angstroms) | Relative Intensity (100 × $I/I_o$) |
|---|---|---|
| 7.5–7.9 | 11.78–11.18 | 80–100 |
| 11.4–11.8 | 7.75–7.49 | 15–30 |
| 13.1–13.5 | 6.75–6.55 | 30–60 |
| 13.7–14.2 | 6.46–6.23 | 10–25 |
| 15.2–15.6 | 5.82–5.67 | 15–30 |
| 19.1–19.6 | 4.64–4.52 | 30–60 |
| 20.2–20.6 | 4.39–4.31 | 30–60 |
| 23.0–23.5 | 3.86–3.78 | 30–60 |
| 23.4–23.8 | 3.80–3.73 | 50–100 |
| 24.4–24.9 | 3.64–3.57 | 50–75 |
| 26.7–27.2 | 3.33–3.27 | 15–25 |
| 28.1–28.5 | 3.17–3.13 | 25–35 |
| 31.0–31.4 | 2.88–2.85 | 70–90 |
| 33.1–33.5 | 2.70–2.67 | 15–30 |
| 35.6–36.0 | 2.52–2.49 | 10–25 |

The X-ray powder diffraction data set forth in Tables 1 and 2 are characteristic of a molecular sieve having the offretite structure. For comparison purposes, the X-ray powder diffraction pattern of a synthetic zeolite with the offretite structure is shown in FIG. 1, and the corresponding X-ray powder diffraction data are set forth in Table 3.

TABLE 3

| X-Ray Powder Diffraction Data for a Synthetic Zeolite with the Offretite Structure | | |
|---|---|---|
| Bragg Angle 2-Theta (Degrees) | Interplanar d-spacings (Angstroms) | Relative Intensity (100 × $I/I_o$) |
| 7.689 | 11.4879 | 97.7 |
| 11.688 | 7.5652 | 21.6 |
| 13.366 | 6.6189 | 46.0 |
| 14.023 | 6.3104 | 12.0 |
| 15.450 | 5.7305 | 22.1 |
| 19.435 | 4.5636 | 35.6 |
| 20.496 | 4.3297 | 51.1 |
| 23.325 | 3.8106 | 36.3 |
| 23.669 | 3.7560 | 100.0 |
| 24.820 | 3.5844 | 63.2 |
| 26.109 | 3.4102 | 3.0 |
| 26.953 | 3.3054 | 20.8 |
| 28.285 | 3.1527 | 23.8 |
| 30.529 | 2.9258 | 4.6 |
| 31.378 | 2.8485 | 75.8 |
| 33.445 | 2.6771 | 19.1 |
| 36.097 | 2.4863 | 14.2 |
| 39.301 | 2.2906 | 3.1 |
| 40.894 | 2.2050 | 7.2 |
| 42.710 | 2.1154 | 3.5 |

TABLE 3-continued

X-Ray Powder Diffraction Data for a Synthetic
Zeolite with the Offretite Structure

| Bragg Angle<br>2-Theta<br>(Degrees) | Interplanar<br>d-spacings<br>(Angstroms) | Relative Intensity<br>$(100 \times I/I_o)$ |
|---|---|---|
| 43.457 | 2.0807 | 3.3 |
| 45.723 | 1.9827 | 3.4 |
| 46.333 | 1.9580 | 4.0 |

The X-ray powder diffraction data set forth in Tables 1 and 2 for the crystalline galliosilicate of the invention and in Table 3 for a zeolite with the offretite structure are based on data obtained using a Siemens D-500 X-ray diffractometer with graphite-crystal monochromatized Cu-K alpha radiation. The peak heights I, and their position as a function of 2-theta, where theta is the Bragg angle, were read from the diffractometer output. From this output the relative intensities, $100 \times I/I_o$, where $I_o$ is the intensity of the strongest peak, were read. The interplanar spacing, d, in angstroms corresponding to the recorded peaks were then calculated in accordance with standard procedures. It will be understood that the peak heights and d-spacings associated with the X-ray powder diffraction pattern of the galliosilicate molecular sieve of the invention may vary somewhat depending on various factors, e.g., heat treatment, unit cell composition, crystal size, and whether the molecular sieve has been exchanged with hydrogen ions or metal cations.

The water content of the crystalline, galliosilicate molecular sieve of the invention will depend on the method used for drying the particles formed upon crystallization. The amount of cations derived from the templating agent present in the dried molecular sieve will depend upon the silica-to-gallia mole ratio and the alkali metal content of the galliosilicate crystals. In general, the moles t of $Q_2O$ present, as shown in formula (5) above, will equal about 1.0 minus the sum of the moles of the two different alkali metal oxides present, $z+y$. Typically, the synthesized galliosilicate of the invention will contain between about 20 and 40 weight percent gallia, sometimes as high as 45 weight percent or more, between about 45 and 70 weight percent silica, and between about 5 and 10 weight percent alkali metal oxide.

After the crystals of the synthesized galliosilicate molecular sieve of the invention have been washed and dried, they are typically treated in order to render them active for acid catalyzed reactions. This procedure normally comprises calcining the washed and dried crystals in air at a temperature between about 400° C. and 700° C., preferably between about 500° C. and 600° C., for between about 5 hours and about 15 hours to decompose the cations derived from the templating agent into gaseous products. After this calcination, the galliosilicate molecular sieve is exchanged with ammonium ions, hydrogen ions, polyvalent cations such as rare earth-containing cations, magnesium cations or calcium cations, or a combination of ammonium ions, hydrogen ions, and polyvalent cations, thereby lowering the alkali metal content to below about 5.0 weight percent, preferably below about 2.0 weight percent, and most preferably below about 0.10 weight percent, calculated as alkali metal oxides. When reducing the alkali metal content using an ammonium ion exchange technique, the molecular sieve is typically slurried for 1 to 5 hours at a temperature above ambient temperature but less than about 100° C. in an aqueous solution containing a dissolved ammonium salt, such as ammonium nitrate, ammonium sulfate, ammonium chloride and the like. Ordinarily, to achieve extremely low levels of alkali metal cations, the ion exchange procedure will be repeated at least twice, and occasionally several times. After the ammonium exchange or other treatment to reduce alkali metal content, the molecular sieve is again calcined in air, preferably at a temperature between about 350° C. and 550° C., to decompose the ammonium cations into ammonia, which is driven off during the calcination step, and thereby produce the catalytically active hydrogen form of the galliosilicate molecular sieve.

The crystalline, galliosilicate molecular sieve of the invention may be used as a component of a catalyst for converting hydrocarbons and other organic compounds into more valuable reaction products by acid catalyzed reactions, such as alkylation, transalkylation, dealkylation, isomerization, dehydrocyclization, dehydrogenation, hydrogenation, cracking, hydrocracking, dewaxing, hydrodewaxing, oligomerization, aromatization, alcohol conversion reactions, the conversion of syngas to mixtures of hydrocarbons and the like. A preferred oligomerization reaction in which a catalyst containing such a sieve may be used is the conversion of low molecular weight olefins and alkanes into cycloparaffins and/or aromatic compounds. In utilizing the galliosilicates of the invention as a catalyst component in conversion processes as described above, it will normally be combined with a porous, inorganic refractory oxide component, or a precursor thereof, such as alumina, silica, titania, magnesia, zirconia, beryllia, silica-alumina, silica-magnesia, silica-titania, a dispersion of silica-alumina in gamma alumina, a clay such as kaolin, hectorite, sepiolite and attapulgite, combinations of the above and the like. The preferred porous, inorganic refractory oxide component will depend upon the particular conversion process involved and will be well known to those skilled in the art. Examples of precursors that may be used include peptized alumina, alumina gel, hydrated alumina, silica-alumina gels, hydrogels, Ziegler-derived aluminas and silica sols. The exact amounts of crystalline galliosilicate and porous, inorganic refractory oxide used in the catalyst of the invention will again depend upon the particular conversion process in which the catalyst is to be used.

It will be understood that, although the primary use of the catalyst of the invention will be in hydrocarbon conversion processes to convert hydrocarbon feedstocks into desirable reaction products, the catalyst can also be used to convert feedstocks or organic compounds other than hydrocarbons into desired reaction products. For example, the catalyst of the invention can be used to convert alcohols into transportation fuels and to convert gaseous mixtures of carbon monoxide and hydrogen into hydrocarbons.

Depending on the particular type of conversion process in which the catalyst of the invention is to be used, it may be desirable that the catalyst also contain a metal promoter or combination of metal promoters selected from Group IB, Group IIB, Group IIIA, Group IVA, Group VA, Group VIB, Group VIIB and Group VIII of the Periodic Table of elements. As used herein "Periodic Table of Elements" refers to the version found in the inside front cover of the "Handbook of Chemistry and Physics," 65th edition, published in 1984 by the Chemical Rubber Company, Cleveland, Ohio. Specific metal components which may be used as promoters include components of copper, silver, zinc, aluminum, gallium, indium, thallium, lead, tin, antimony, bismuth, chromium, molybdenum, tungsten, manganese, iron, cobalt, nickel, ruthenium, rhodium, palladium, iridium, platinum, rhenium, thorium and the rare earths. These metal promoters may be ion exchanged into the crystalline galliosilicate itself, they may be incorporated into the mixture of the crystalline galliosilicate and the porous, inorganic refractory oxide, or they may be added by impregnation after the catalyst particles have been formed.

The catalyst of the invention is normally prepared by mulling the crystalline galliosilicate molecular sieve in powder form with the porous, inorganic refractory oxide component. If desired, a binder such as peptized Catapal alumina may be incorporated into the mulling mixture, as also may be one or more active promoter metal precursors. After mulling, the mixture is extruded through a die having openings of a cross sectional size and shape desired in the final catalyst particles. For example, the die may have circular openings to produce cylindrical extrudates, openings in the shape of three-leaf clovers so as to produce an extrudate material similar to that shown in FIGS. 8 and 8A of U.S. Pat. No. 4,028,227, the disclosure of which is hereby incorporated by reference in its entirety, or openings in the shape of four-leaf clovers. Among preferred shapes for the die openings are those that result in particles having surface-to-volume ratios greater than about 100 reciprocal inches. If the die opening is not circular in shape, it is normally desirable that the opening be in a shape such that the surface-to-volume ratio of the extruded particles is greater than that of a cylinder. After extrusion, the catalyst particles are broken into lengths of from 1/16 to ½ inch and calcined in air at a temperature of at least 750° F., usually between about 800° F. and about 1200° F., and preferably in the range between about 900° F. and 1050° F.

As mentioned previously, metal promoter components may be mulled, either as a solid or liquid, with the galliosilicate of the invention and the porous, inorganic refractory oxide component to form the catalyst extrudates prior to the calcination step. Alternatively, the metal promoter component or components may be added to the catalyst by impregnation after the calcination step. The metal promoter component or components may be impregnated into the calcined extrudates from a liquid solution containing the desired metal promoter component or components in dissolved form. In some cases, it may be desirable to ion exchange the calcined extrudates with ammonium ions prior to adding the metal promoter component or components. After the calcined extrudates have been impregnated with the solution containing the metal promoter component or components, the particles are dried and calcined in air at a temperature normally ranging between about 800° F. and about 1200° F. to produce the finished catalyst particles.

In addition to the crystalline, galliosilicate molecular sieve of the invention, the catalyst of the invention may also contain other molecular sieves such as aluminosilicates, borosilicates, aluminophosphates, silicoaluminophosphates, naturally occurring zeolites, pillared clays and delaminated clays. Suitable aluminosilicates for combining with the crystalline galliosilicate of the invention include synthetic zeolites with the faujasite structure such as Y zeolites, ultrastable Y zeolites, X zeolites and the like, zeolite beta, zeolite L, and zeolite omega. The actual molecular sieve used in combination with the crystalline galliosilicate will depend upon the particular conversion process in which the catalyst of the invention is to be used. The molecular sieve of choice is normally incorporated into the catalyst by mixing the molecular sieve with the crystalline galliosilicate and porous, inorganic refractory oxide prior to mulling and extrusion.

It is typically preferred to use catalysts containing the crystalline galliosilicate molecular sieve of the invention as a cracking or oligomerization catalyst in the absence of added hydrogen or in hydroconversion processes such as hydrocracking, isomerization and hydrodewaxing. When used in hydroconversion processes, the catalyst will normally contain hydrogenation components comprising metals selected from Group VIII and/or Group VIB of the Periodic Table of Elements. These hydrogenation metal components are incorporated into the catalyst extrudates either prior to or after extrusion. Examples of Group VIII and Group VIB metal components that may be used include nickel, cobalt, tungsten, molybdenum, palladium and platinum components. In some cases, it may be desirable that the catalyst contain at least one Group VIII metal component and at least one Group VIB metal component. When this is the case, the preferred combination is a nickel and/or cobalt component with a molybdenum and/or tungsten component.

If the hydrogenation metal component consists essentially of one or more noble metals such as platinum or palladium or compounds thereof, it is generally desired that the finished catalyst particles contain between about 0.05 and about 10 weight percent of the hydrogenation metal component, preferably between about 0.10 weight percent and about 3.0 weight percent, calculated as the metal. If on the other hand, the hydrogenation metal component consists essentially of one or more non-noble metals, such as nickel or nickel and tungsten or compounds thereof, it is normally desired that the finished catalyst particles contain between about 1.0 and about 40 weight percent of the hydrogenation metal components, preferably between about 3 weight percent and about 30 weight percent, calculated as the metal oxide.

Feedstocks that may be subjected to hydroconversion processes using the catalyst of the invention include mineral oils, synthetic oils, such as shale oil, oil derived from tar sands and coal liquids, and the like. Examples of appropriate feedstocks for hydroconversion processes include straight run gas oils, vacuum gas oils and catalytic cracker distillates. Preferred hydroconversion feedstocks include gas oils and other hydrocarbon fractions having at least about 50 weight percent of their components boiling above about 700° F.

In general, the temperature at which the hydroconversion process takes place is between about 450° F. and about 850° F., preferably between about 600° F. and about 800° F. The pressure will normally range between about 750 and about 3500 p.s.i.g., preferably between about 1000 and about 3000 p.s.i.g. The liquid hourly space velocity (LHSV) is typically between about 0.3 and about 5.0, preferably between about 0.5 and about 3.0, reciprocal hours. The ratio of hydrogen gas to feedstock utilized will usually range between about 1000 and about 10,000 scf/bbl, preferably between about 2000 and about 8000 scf/bbl as measured at 60° F. and one atmosphere.

Since the crystalline, galliosilicate molecular sieve of the invention has the offretite structure, its pore size will be about 6.0 angstroms, a pore size which makes the crystalline galliosilicate of the invention particularly suited for use as a component of a catalyst employed in dewaxing or hydrodewaxing processes. Dewaxing and hydrodewaxing differ from hydrocracking in that these processes involve the selective cracking of molecules and do not significantly change the boiling point range of the feedstock because essentially only the straight and slightly branched chain paraffin molecules in the feedstock are cracked while essentially all the highly branched chain paraffins, aromatic and cyclic molecules in the feedstock remain unchanged. Hydrocracking, on the other hand, involves the indiscriminate or nonselective cracking of molecules in the presence of added hydrogen and always results in a significant alteration of the boiling point range of the feedstock because a substantial proportion of all types of molecules comprising the feedstock are converted into lower boiling components. Hydrodewaxing differs from dewaxing in that the former is carried out in the presence of added hydrogen while the latter is not. When catalysts of the invention containing a crystalline galliosilicate with the offretite structure are used in dewaxing or hydrodewaxing processes, the boiling point of the effluent from the dewaxing or hydrodewaxing zone will be approximately the same as the boiling point of the feedstock. In the case of maximum conversion in the dewaxing or hydrodewaxing zone, the boiling point of the effluent will be no more than about 20° F. lower than that of the feedstock.

The nature and objects of the invention are further illustrated by the following examples, which are provided for illustrative purposes only and not to limit the invention as defined by claims. Examples 1 and 2 demonstrate the one-batch method of synthesizing a crystalline galliosilicate with the offretite structure while Example 3 shows that using the two-batch method results in much shorter crystallization times.

EXAMPLE 1

In accordance with the one-batch embodiment of the process of the invention, an aqueous solution of potassium hydroxide and sodium hydroxide was prepared by dissolving commercial grade potassium hydroxide and sodium hydroxide crystals in distilled water. Gallium oxide was then added to the solution and the resultant mixture was vigorously stirred under boiling conditions until the gallium oxide was completely dissolved. Tetramethylammonium chloride was then added to the basic solution of gallium oxide and the mixture was stirred for an additional 30 minutes. After stirring, Ludox HS-40, a colloidal silica sol manufactured and sold by the DuPont Chemical Company, was added to the stirred mixture to form a hydrogel reaction mixture having the following composition expressed in terms of oxide mole ratios:

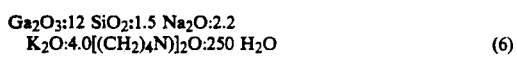

The resultant hydrogel was stirred at ambient temperature and pressure for about 10 hours and then heated at 125° C. in an autoclave for about 4 days. The approximate time when crystallization was complete was not determined but crystallization was essentially complete when the autoclave was opened after the 4-day period. The crystals of galliosilicate formed had the following composition expressed in terms of oxide mole ratios in the anhydrous state:

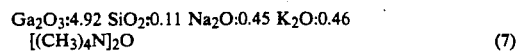

Figure 2:
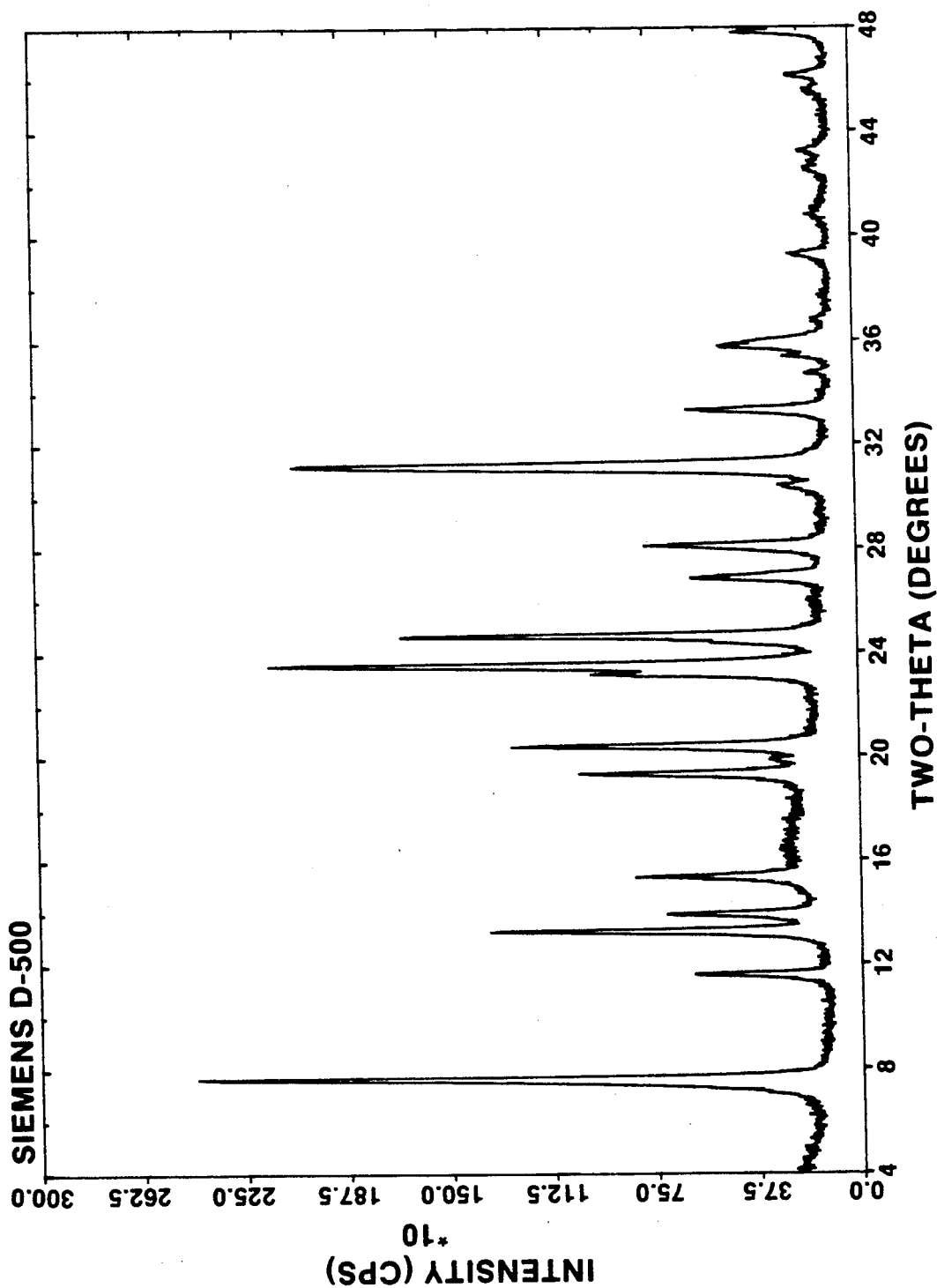
FIG. 2 depicts the X-ray powder diffraction pattern of a galliosilicate molecular sieve of the invention synthesized in accordance with the process of the invention as exemplified in Example 1.

An X-ray diffractogram of the crystals was obtained using a Siemens D-500 X-ray diffractometer with graphite-crystal monochromatized Cu-K alpha radiation. The resultant X-ray powder diffraction pattern is shown in FIG. 2 and the corresponding X-ray powder diffraction data including the calculated d-spacings are set forth in Table 4 below.

TABLE 4

X-Ray Powder Diffraction Data for the Crystalline Galliosilicate of Example 1

| Bragg Angle 2-Theta (Degrees) | Interplanar d-spacings (Angstroms) | Relative Intensity (100 × $I/I_o$) |
| --- | --- | --- |
| 7.667 | 11.5208 | 100.0 |
| 11.626 | 7.6053 | 21.6 |
| 13.317 | 6.6433 | 50.1 |
| 13.957 | 6.3400 | 21.7 |
| 15.393 | 5.7519 | 26.4 |
| 19.353 | 4.5828 | 34.8 |
| 20.425 | 4.3446 | 45.9 |
| 23.253 | 3.8222 | 35.9 |
| 23.567 | 3.7720 | 86.9 |
| 24.662 | 3.6070 | 66.2 |
| 26.868 | 3.3156 | 20.7 |
| 28.128 | 3.1699 | 28.4 |
| 30.416 | 2.9365 | 5.4 |
| 31.201 | 2.8643 | 83.6 |
| 33.316 | 2.6871 | 22.3 |
| 35.827 | 2.5043 | 14.4 |
| 39.273 | 2.2922 | 6.6 |
| 40.814 | 2.2091 | 2.9 |
| 42.568 | 2.1221 | 2.6 |
| 43.261 | 2.0897 | 4.0 |
| 45.553 | 1.9897 | 2.9 |
| 46.131 | 1.9662 | 5.9 |

The X-ray powder diffraction pattern set forth in FIG. 2 is substantially similar to that set forth in FIG. 1 for a zeolite with the offretite structure. Thus, it was concluded that the crystalline galliosilicate synthesized in Example 1 has the offretite structure. The d-spacing values for the synthesized galliosilicate set forth in Table 4 are higher than the corresponding values in Table 3 for the zeolite with the offretite structure. These increases in d-spacing values are consistent with a larger unit cell size for the galliosilicate as shown in Table 5 below. This larger unit cell size is attributed to the isomorphous substitution of gallium, which has a larger ionic radius than aluminum, for aluminum in the offretite structure.

TABLE 5

Unit Cell Parameters

| Molecular Sieve | $a_o$ (Angstroms) | $c_o$ (Angstroms) |
| --- | --- | --- |
| Natural Offretite | 13.291 | 7.582 |
| Synthetic Al-Offretite | 13.075 | 7.552 |
| Synthetic Ga-Offretite | 13.271 | 7.602 |
| Synthetic H (Ga-Offretite) | 13.188 | 7.536 |

The crystals of the galliosilicate formed in the autoclave were subjected to calcination in flowing air at a temperature of 600° C. to decompose the tetramethylammonium cations. The resultant crystals were then ion exchanged with ammonium cations by slurrying the crystals in a 3 molar solution of ammonium nitrate. The ammonium-exchanged galliosilicate crystals were then calcined at 600° C. for 10 hours. The resultant crystals had a BET surface area of 400 m²/gram and retained about 100 percent of their original crystallinity. The unit cell dimension $a_o$ of the final crystals was about 13.188, which represents a small contraction from the as synthesized crystals. This small contraction is attributed to the removal of the tetramethylammonium cations and to the ion exchange procedure.

EXAMPLE 2

A hydrogel reaction mixture of the composition shown in formula (6) of Example 1 was prepared by the one-batch method following the procedures of Example 1 and was stirred at ambient temperature for about 10 hours. The hydrogel was then placed in a round-bottom glass flask, which was wrapped in a heating mantle and contained a stirring mechanism, and heated at a temperature of about 98° C. with stirring to promote crystallization. About 10 milliliters of material was removed from the flask at about one-hour intervals during the heating step and analyzed for crystallinity using X-ray powder diffraction techniques to generate X-ray diffractograms which were then analyzed to determine the extent of crystallization of the reaction mixture at the time of sampling. The percent crystallinity of each sample was calculated by summing the heights of the peaks on the X-ray diffractogram of that sample that corresponded to d-spacings of about 20.2 and about 31.2 angstroms and dividing this sum by the sum of the heights of the same peaks measured in the X-ray diffractograms of the samples taken at the end of the crystallization period. Crystallization was considered complete when the X-ray diffractograms of two successive samples did not show any significant variation in the peak intensities corresponding to these d-spacings. The crystallinity data gathered as described above are set forth below in Table 6.

TABLE 6

| Time of Heating (Hours) | % Crystallinity | |
|---|---|---|
| | Example 3 Reaction Mixture | Example 2 Reaction Mixture |
| 10 | — | 0 |
| 11 | — | 0 |
| 12 | — | 0 |
| 13 | 98 | 0 |
| 14 | 99 | 0 |
| 15 | 107 | 0 |
| 16 | 98 | 0 |
| 17 | 100 | 0 |
| 18 | 100 | 0 |
| 19 | | 0 |
| 20 | | 3 |
| 21 | | 79 |
| 22 | | 88 |
| 23 | | 88 |
| 24 | | 105 |
| 25 | | 100 |

As can be seen from Table 6, the hydrogel reaction mixture prepared by the one-batch method was completely amorphous after 19 hours of heating but was fully crystallized after about 24 hours had elapsed. An X-ray diffractogram of the resultant crystals was obtained described in Example 1 and was substantially similar to that set forth in FIG. 1 for a zeolite with the offretite structure. Thus, it was concluded that the crystals are that of a galliosilicate having the offretite structure.

The crystals formed at atmospheric pressure in the flask were calcined in flowing air at 550° C. for 10 hours to remove the tetramethylammonium cations. The resultant crystals had a BET surface area of 398 m²/gram and the composition, expressed in terms of oxide mole ratios, shown below $Ga_2O_3$:6.13 $SiO_2$:0.13 $Na_2O$:0.50 $K_2O$.

EXAMPLE 3

A hydrogel reaction mixture having the composition shown in formula (6) of Example 1 was prepared following the two-batch embodiment of the process of the invention instead of the one-batch embodiment illustrated in Examples 1 and 2. A sodium gallate solution was prepared by mixing in a glass beaker gallium oxide with an aqueous solution of sodium hydroxide made by dissolving commercial grade sodium hydroxide crystals in distilled water. The mixture of gallium oxide and sodium hydroxide was vigorously stirred under boiling conditions until the gallium oxide was completely dissolved. After stirring, Ludox HS-40 was added dropwise to the stirred mixture to form a hydrogel. The resultant hydrogel was stirred at room temperature until the gel passed into solution generating a clear liquid galliosilicate solution substantially free of dispersed particles having the following composition expressed in terms of oxide mole ratios:

$Ga_2O_3$:15 $SiO_2$:10 $Na_2O$:400 $H_2O$

An aqueous solution of potassium hydroxide and sodium hydroxide was then prepared in a second glass beaker by dissolving commercial grade potassium hydroxide and sodium hydroxide crystals in distilled water. Gallium oxide was added to the solution and the resultant mixture was vigorously stirred under boiling conditions until the gallium oxide was completely dissolved. Tetramethylammonium chloride was then added to the basic solution, and the resultant mixture was stirred for an additional 30 minutes. After stirring, Ludox HS-40 silica sol was added to the stirred mixture to form a galliosilicate hydrogel having the following composition expressed in terms of oxide mole ratios:

$Ga_2O_3$:11.67 $SiO_2$:0.56 $Na_2O$:2.44
$K_2O$:4.44[$(CH_3)_4N]_2O$:278 $H_2O$

A sufficient amount of the galliosilicate solution prepared in the first beaker was slowly added to the galliosilicate hydrogel in the second beaker so that the resultant hydrogel reaction mixture had the same composition as the reaction mixtures formed in Examples 1 and 2, i.e., $Ga_2O_3$:12.0 $SiO_2$:1.5 $Na_2O$:2.2 $K_2O$:4.0
[$(CH_3)_4N]_2O$:250 $H_2O$.

The hydrogel reaction mixture was stirred at ambient temperature for about 10 hours and then transferred to a round-bottom glass flask and heated to promote crystallization as described in Example 2. Samples of the hydrogel were taken at one-hour intervals starting at 13 hours after heating in the round-bottom flask began. Each sample was analyzed for crystallinity as described in Example 2. The results of these analyses are set forth in Table 6 above. As can be seen, the first sample taken 13 hours after heating began was essentially completely crystallized, thereby indicating that the hydrogel may have been completely crystallized in less than 13 hours as compared to the approximately 25 hours required to crystallize a hydrogel with the same composition under the same conditions but prepared according to the one-batch technique of Example 2. This reduction of crystallization time by one-half or more is not only surprising but results in a significant savings in the fuel needed to carry out the crystallization.

An X-ray diffractogram of the resultant crystals was obtained as described in Examples 1 and 2 and was found to be substantially similar to that set forth in FIG. 1 for a zeolite with the offretite structure. Thus, it was concluded that the crystals are that of a galliosilicate having the offretite structure. The crystals were calcined in flowing air at 550° C. for 10 hours to remove the tetramethylammonium cations. The resultant crystals had the composition, expressed in terms of oxide mole ratios, shown below:

$Ga_2O_3 : 5.91\ SiO_2 : 0.12\ Na_2O : 0.53\ K_2O.$

It will be apparent from the foregoing that the invention provides a crystalline, galliosilicate molecular sieve having the offretite structure and methods for preparing such a sieve. Catalysts containing such a molecular sieve are useful in a variety of chemical conversion processes, particularly hydrocarbon conversion processes such as oligomerization, hydrodewaxing and hydrocracking.

Although this invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A process for synthesizing a crystalline, galliosilicate molecular sieve whose X-ray powder diffraction pattern comprises the d-spacings set forth in Table 1 below:

TABLE 1

| Interplanar d-spacings (Angstroms) | Relative Intensity (100 × I/I$_o$) |
|---|---|
| 11.52 ± 0.50 | 80–100 |
| 6.64 ± 0.20 | 30–60 |
| 4.34 ± 0.15 | 30–60 |
| 3.77 ± 0.15 | 50–100 |
| 3.61 ± 0.10 | 50–75 |
| 2.86 ± 0.10 | 70–90 | which process comprises:
(a) adding a galliosilicate solution substantially free of alumina and having the following oxide mole ratios of components $SiO_2/Ga_2O_3 = 5$ to 30

$(M_2O\ or\ N_2O)/Ga_2O_3 = 6$ to 20

$H_2O/Ga_2O_3 = 200$ to 800 to an essentially alumina-free galliosilicate hydrogel having the following oxide mole ratios of components $SiO_2/Ga_2O_3 = 8$ to 15

$(M_2O + N_2O)/Ga_2O_3 = 1$ to 10

$H_2O/Ga_2O_3 = 80$ to 1000

$Q_2O/Ga_2O_3 = 0.1$ to 10 to form a mixture of said solution and said hydrogel, said mixture having the following oxide mole ratios of components $SiO_2/Ga_2O_3 = 6$ to 30

$(M_2O + N_2O)/Ga_2O_3 = 1$ to 15

$H_2O/Ga_2O_3\ 32\ 80$ to 1000

$Q_2O/Ga_2O_3 = 0.1$ to 10 where M is an alkali metal, N is an alkali metal other than M and Q is a cation derived from an offretite selective templating agent; and
(b) crystallizing said mixture to form said galliosilicate molecular sieve, wherein the crystallization is essentially complete in less than about 10 hours.

2. A process as defined by claim 1 wherein M is sodium and N is potassium.

3. A process as defined by claim 2 wherein Q comprises a quaternary ammonium cation selected from the group consisting of a tetramethylammonium cation, a choline cation, a benzyltrimethylammonium cation, a benzyltriethylammonium cation and a 1,4-diazabicyclo (2,2,2) octane cation.

4. A process as defined by claim 3 wherein Q is a tetramethylammonium cation.

5. A process as defined in claim 2 wherein said mixture has the following oxide mole ratios of components $SiO_2/Ga_2O_3 = 10$ to 15

$(Na_2O + K_2O)/Ga_2O_3 = 2$ to 5

$H_2O/Ga_2O_3 = 100$ to 400

$Q_2O/Ga_2O_3 = 0.5$ to 5.0.

6. A process as defined by claim 2 wherein said galiosilicate molecular sieve has an X-ray powder diffraction pattern characteristic of the offretite structure.

7. A process as defined by claim 1 wherein said galliosilicate molecular sieve has an X-ray powder diffraction pattern characteristic of the offretite structure.

8. A process as defined by claim 1 wherein said galliosilicate solution is formed by dissolving gallium oxide in an aqueous solution of sodium hydroxide and adding a source of silica thereto, and said galliosilicate hydrogel is formed by dissolving gallium oxide in an aqueous solution of sodium hydroxide and potassium hydroxide and adding a source of silica and said templating agent thereto.

9. A process for synthesizing a crystalline, galliosilicate molecular sieve having the offretite structure which comprises:
(a) mixing, in the absence of a source of aluminum, a source of gallia, a source of silica, a source of potassium, a source of sodium, an offretite selective templating agent and water to form a galliosilicate hydrogel, said hydrogel having the following oxide mole ratios of components $SiO_2/Ga_2O_3 = 8$ to 15

$(Na_2O+K_2O)/Ga_2O_3 = 1$ to 10

$H_2O/Ga_2O_3 = 80$ to 1000

$Q_2O/Ga_2O_3 = 0.1$ to 10 where Q is a cation derived from said templating agent;
(b) adding to said hydrogel a galliosilicate solution having the following oxide mole ratios of components $SiO_2/Ga_2O_3 = 5$ to 30

$Na_2O/Ga_2O_3 = 6$ to 20

$H_2O/Ga_2O_3 = 200$ to 800 to form a mixture of said solution and said hydrogel, said mixture having the following oxide mole ratios of components $SiO_2/Ga_2O_3 = 6$ to 30

$(Na_2O+K_2O)/Ga_2O_3 = 1$ to 15

$H_2O/Ga_2O_3 = 80$ to 1000

$Q_2O/Ga_2O_3 = 0.1$ to 10 wherein said galliosilicate solution is prepared by mixing, in the absence of a source of aluminum, a source of gallia, a source of silica, a source of sodium and water; and
(c) crystallizing said mixture at a temperature below about 250° C. to form a galliosilicate molecular sieve having the offretite structure, wherein said crystallization is essentially complete in less than about 10 hours.

10. A process as defined by claim 9 wherein said source of gallia comprises gallium oxide.

11. A process as defined by claim 9 wherein said source of sodium comprises sodium hydroxide.

12. A process as defined by claim 9 wherein said source of potassium comprises potassium hydroxide.

13. A process as defined by claim 9 wherein said source of silica comprises a silica sol.

14. A process as defined by claim 9 wherein Q is selected from the group consisting of a quaternary ammonium cation and a protonated amine.

15. A process as defined by claim 9 wherein Q is a quaternary ammonium cation selected from the group consisting of a choline cation, a tetramethylammonium cation, a benzyltrimethylammonium cation, a benzyltriethylammonium cation and a 1,4-diazabicyclo (2,2,2) octane cation.

16. A process as defined by claim 9 wherein Q is a tetramethylammonium cation.

17. A process as defined by claim 9 wherein step (c) is carried out at a temperature between about 90° C. and about 120° C.

18. A process as defined by claim 9 wherein said $Na_2O/Ga_2O_3$ mole ratio in the galliosilicate solution of step (b) is between about 8 and about 15.

19. A process as defined by claim 9 wherein the galliosilicate hydrogel formed in step (a) has the following oxide mole ratios of components $SiO_2/Ga_2O_3 = 9$ to 12

$(Na_2O+K_2O)/Ga_2O_3 = 2$ to 5

$H_2O/Ga_2O_3 = 100$ to 400

$Q_2O/Ga_2O_3 = 0.5$ to 5.0.

20. A process as defined by claim 19 wherein the galliosilicate solution of step (b) has the following oxide mole ratios of components $SiO_2/Ga_2O_3 = 10$ to 20

$Na_2O/Ga_2O_3 = 8$ to 15

$H_2O/Ga_2O_3 = 300$ to 500.

21. A process as defined by claim 20 wherein the mixture of said galliosilicate hydrogel and said galliosilicate solution has the following oxide mole ratios of components $SiO_2/Ga_2O_3 = 10$ to 15

$(Na_2O+K_2O)/Ga_2O_3 = 2$ to 5

$H_2O/Ga_2O_3 = 100$ to 400

$Q_2O/Ga_2O_3 = 0.5$ to 5.0.

22. A process as defined by claim 21 wherein said galliosilicate molecular sieve having the offretite structure has the following composition expressed in terms of oxide mole ratios in the anhydrous state $Ga_2O_3:xSiO_2:yNa_2O:zK_2O:tQ_2O$ wherein x equals 5.5 to 30, y equals 0.1 to 0.9, z equals 0.1 to 0.9, t equals 0.1 to 0.6, and $y+z+t$ equals about 1.0.

23. A process as defined by claim 22 wherein x equals 6 to 15.

24. A process as defined by claim 1 wherein said galliosilicate solution is clear and substantially free of dispersed particles.

25. A process as defined by claim 6 wherein said galliosilicate solution is clear and substantially free of dispersed particles.

26. A process as defined by claim 7 wherein said galliosilicate solution is clear and substantially free of dispersed particles.

27. A process as defined by claim 9 wherein said galliosilicate solution is clear and substantially free of dispersed particles.

28. A process as defined by claim 21 wherein said galliosilicate solution is clear and substantially free of dispersed particles.

29. A process as defined by claim 1 wherein step (b) is carried out at a temperature between about 90° C. and 120° C.

30. A process for synthesizing a crystalline, galliosilicate molecular sieve having a offretite crystal structure which consists essentially of:

(a) adding a galiosilicate solution substantially free of alumina and having the following oxide mole ratios of components:

$SiO_2/Ga_2O_3 = 5$ to 30

$(M_2O$ or $N_2O)/Ga_2O_3 = 6$ to 20

$H_2O/Ga_2O_3 = 200$ to 800 to an essentially alumina-free galliosilicate hydrogel having the following oxide mole ratios of components:

$SiO_2/Ga_2O_3 = 8$ to 15

$(M_2O + N_2O)/Ga_2O_3 = 1$ to 10

$H_2O/Ga_2O_3 = 80$ to 1000

$Q_2O/Ga_2O_3 = 0.1$ to 10 to form a mixture of said solution and said hydrogel where M is an alkali metal, N is an alkali metal other than M and Q is a cation derived from an offretite selective templating agent; and (b) crystallizing said mixture to form said galliosilicate molecular sieve, wherein the crystallization is essentially complete in less tan about 10 hours.

31. A process as defined by claim 30 wherein M is sodium and N is potassium.

32. A process as defined by claim 31 wherein said galliosilicate solution is clear and substantially free of dispersed particles.

33. A process as defined by claim 31 wherein step (b) is carried out at a temperature between about 90° C. and 1201° C.

* * * * *

UNITED STATES PATENT AND TRADEMARK OFFICE
CERTIFICATE OF CORRECTION

PATENT NO. : 5,133,951
DATED : July 28, 1992
INVENTOR(S) : Mario L. Occelli

It is certified that error appears in the above-indentified patent and that said Letters Patent is hereby corrected as shown below:

Column 18, claim 1, line 19, replace "$H_2O/Ga_2O_3 32$ 80 to 1000" with -- $H_2O/Ga_2O_3 = 80$ to 1000 --.

Column 22, claim 33, line 18, replace "1201 ° C." with -- 120° C. --.

Signed and Sealed this

Seventh Day of February, 1995

Attest:

BRUCE LEHMAN

Attesting Officer

Commissioner of Patents and Trademarks